United States Patent
Hegde

(10) Patent No.: US 11,134,053 B2
(45) Date of Patent: Sep. 28, 2021

(54) DETERMINING CACHE TIME TO LIVE IN AN OBJECT STORAGE SYSTEM

(71) Applicant: International Business Machines Corporation, Armonk, NY (US)

(72) Inventor: Harsha Hegde, Buffalo Grove, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/514,176

(22) Filed: Jul. 17, 2019

(65) Prior Publication Data

US 2021/0021563 A1    Jan. 21, 2021

(51) Int. Cl.
*H04L 29/12* (2006.01)
*H04L 12/841* (2013.01)
*H04L 29/08* (2006.01)

(52) U.S. Cl.
CPC ........ *H04L 61/1511* (2013.01); *H04L 47/286* (2013.01); *H04L 61/6009* (2013.01); *H04L 67/2852* (2013.01)

(58) Field of Classification Search
CPC ............. H04L 61/1511; H04L 67/2852; H04L 61/6009; H04L 47/286
See application file for complete search history.

(56) References Cited

U.S. PATENT DOCUMENTS

| | | | |
|---|---|---|---|
| 7,441,045 B2 | 10/2008 | Skene et al. | |
| 9,026,661 B2 | 5/2015 | Swildens et al. | |
| 9,686,173 B1 | 6/2017 | Giordano et al. | |
| 9,729,675 B2 | 8/2017 | Luecke et al. | |
| 9,979,657 B2 | 5/2018 | Batrouni et al. | |
| 10,154,068 B2 | 12/2018 | Lermant | |
| 10,460,004 B1* | 10/2019 | Yanacek | G06F 16/9574 |
| 2004/0128346 A1* | 7/2004 | Melamed | H04L 29/06 709/203 |
| 2005/0010727 A1* | 1/2005 | Cuomo | G06F 16/9574 711/138 |
| 2008/0228864 A1* | 9/2008 | Plamondon | G06F 16/9574 709/203 |
| 2018/0288453 A1* | 10/2018 | Schmidt | H04L 65/602 |

OTHER PUBLICATIONS

Basu, et al.; Adaptive TTL-based caching for content delivery; IEEE/ACM Transactions on Networking; Jun. 2018; pp. 1063-1077; vol. 26, iss. 3.

* cited by examiner

*Primary Examiner* — Caroline H Jahnige
(74) *Attorney, Agent, or Firm* — Anthony England; Andrew D. Wright; Roberts Calderon Safran & Cole, P.C.

(57) ABSTRACT

A method for execution by a computing device of an access layer of an object storage system includes receiving, via a network, a request message from an edge node, wherein the request message indicates a requested access of a data object. An update frequency of the data object is determined in response to receiving the request message, and a cache time to live (TTL) is determined based on the update frequency. Performance of the requested access of the data object is facilitated in response to receiving the request message, and a response message that includes the cache TTL is generated in response to performing the requested access. The response message is transmitted to the edge node via the network.

11 Claims, 12 Drawing Sheets

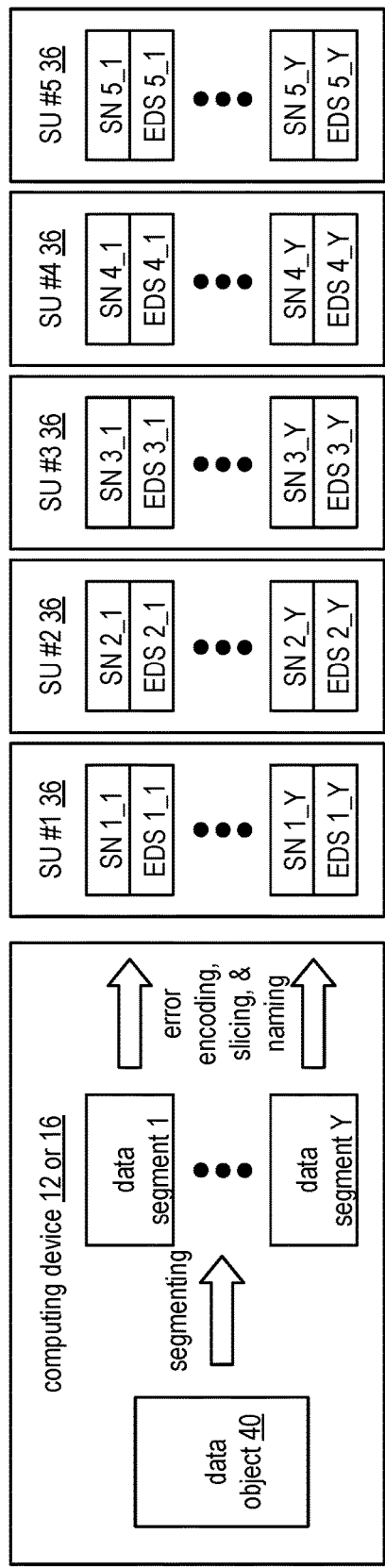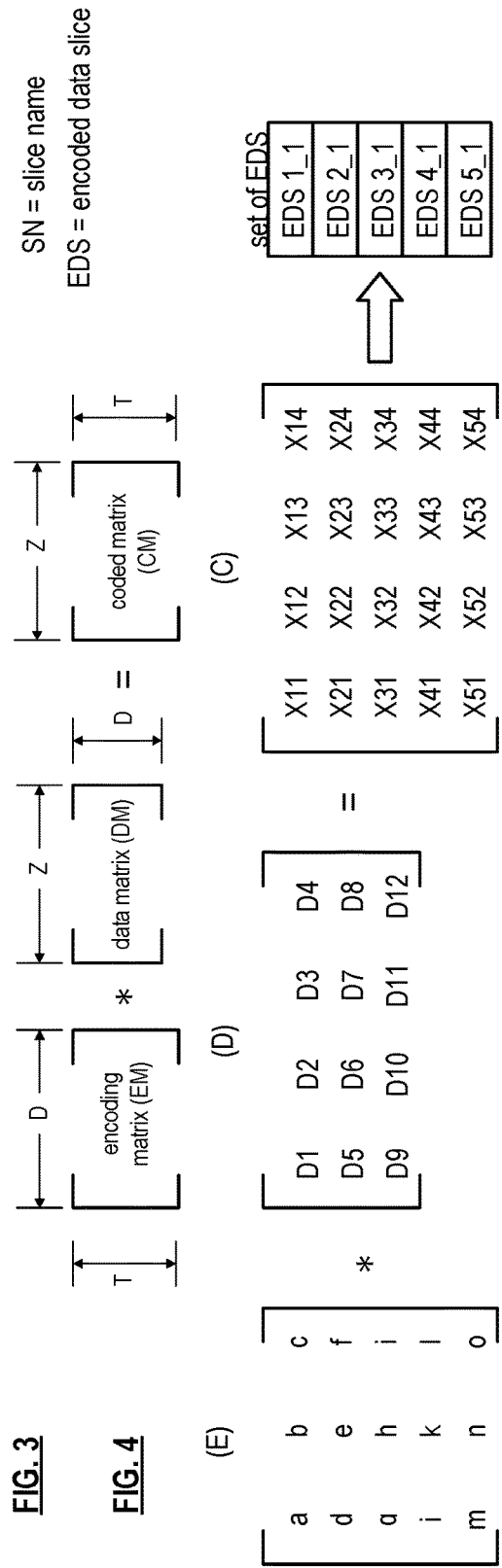

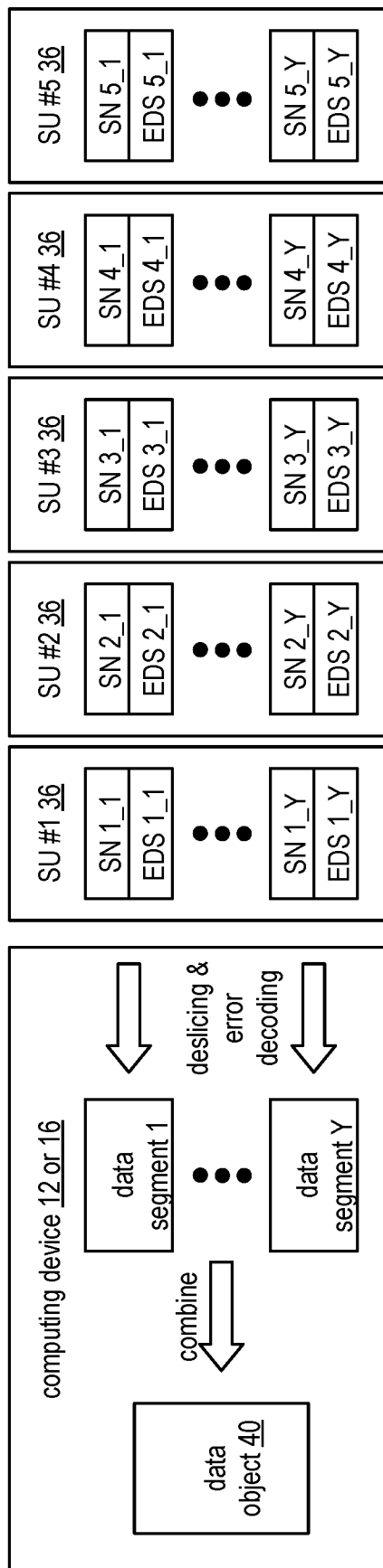

DETERMINING CACHE TIME TO LIVE IN AN OBJECT STORAGE SYSTEM

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 7 is a schematic block diagram of an example of dispersed storage error decoding of data in accordance with the present invention;

FIG. 8 is a schematic block diagram of a generic example of an error decoding function in accordance with the present invention;

DETAILED DESCRIPTION OF THE INVENTION

Figure 1:
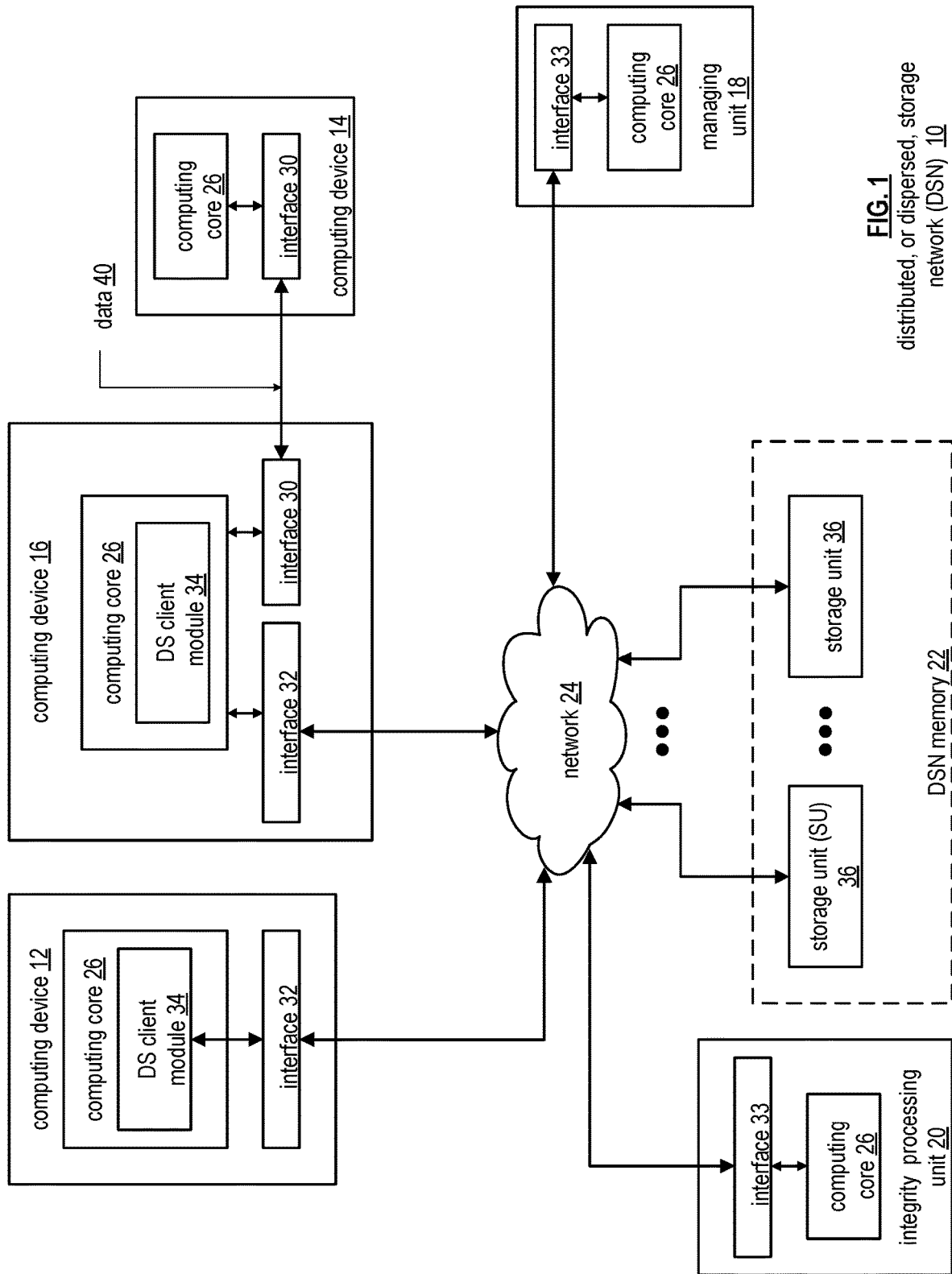
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; one or more satellite communication systems; one or more fiber optic communication systems; and/or one or more local area networks (LAN) and/or wide area networks (WAN).

Figure 2:
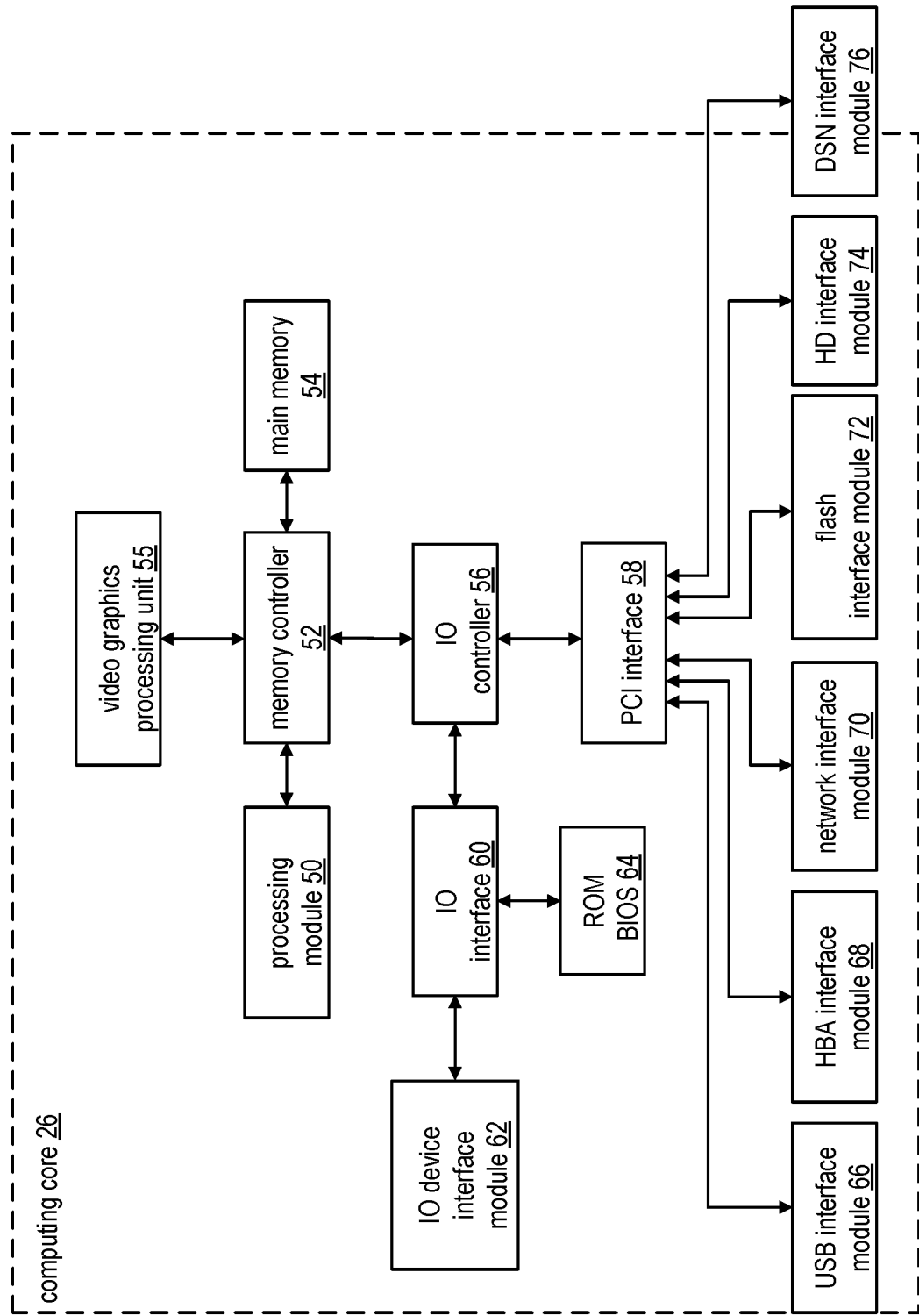
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

In various embodiments, each of the storage units operates as a distributed storage and task (DST) execution unit, and is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, a storage unit may be interchangeably referred to as a dispersed storage and task (DST) execution unit and a set of storage units may be interchangeably referred to as a set of DST execution units.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each managing unit 18 and the integrity processing unit 20 may be separate computing devices, may be a common computing device, and/or may be integrated into one or more of the computing devices 12-16 and/or into one or more of the storage units 36. In various embodiments, computing devices 12-16 can include user devices and/or can be utilized by a requesting entity generating access requests, which can include requests to read or write data to storage units in the DSN.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. Here, the computing device stores data object 40, which can include a file (e.g., text, video, audio, etc.), or other data arrangement. The dispersed storage error encoding parameters include an encoding function (e.g., information dispersal algorithm (IDA), Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.). As used herein, the dispersed storage error encoding parameters can be interchangeably referred to as IDA parameters, and T can be interchangeable referred to an IDA width threshold of a dispersed storage error encoding function.

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides data object 40 into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9A:
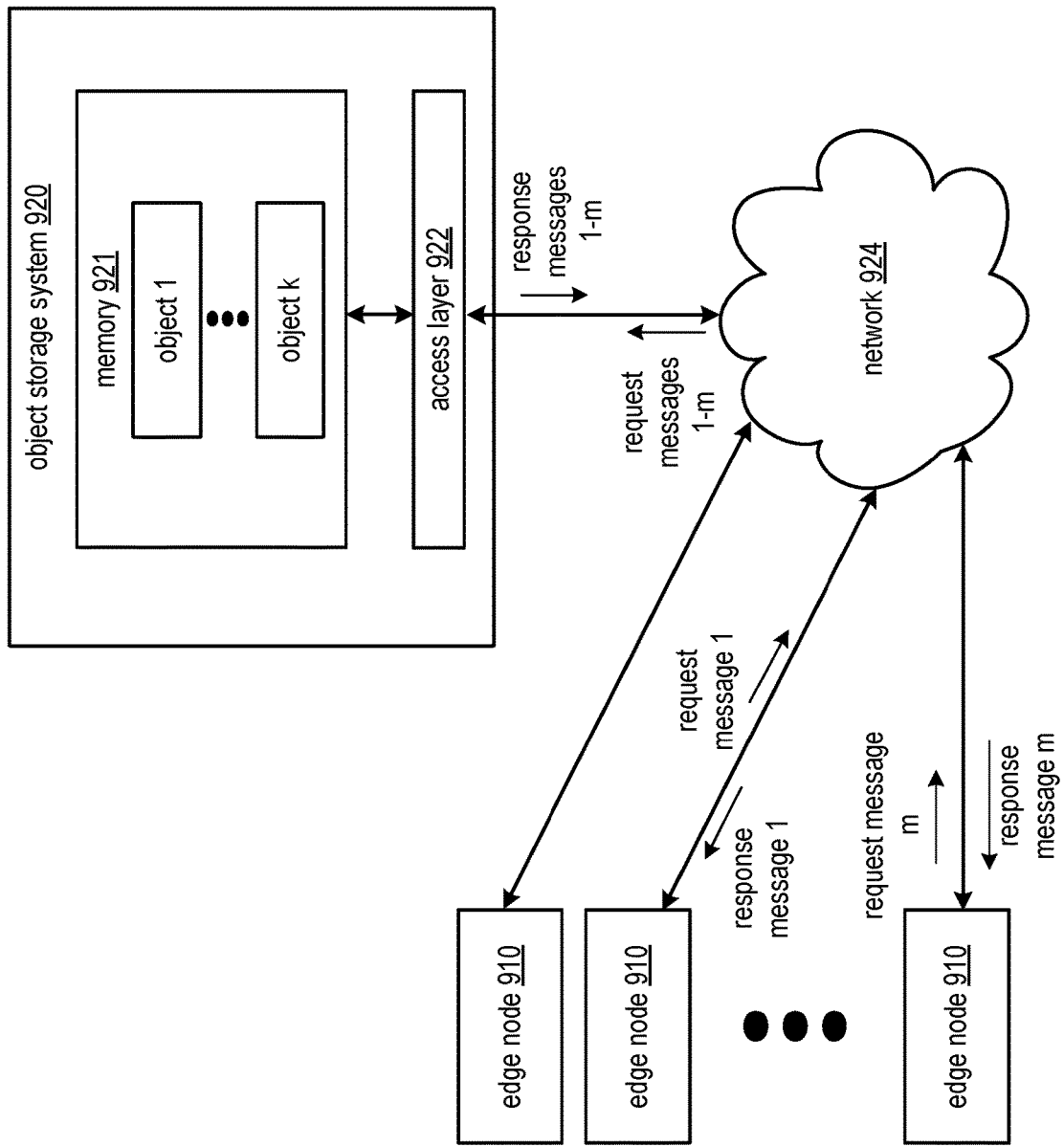
FIG. 9A is a schematic block diagram of an embodiment of an object storage system in accordance with the present invention.

FIG. 9A is a schematic block diagram of an embodiment of an object storage system 920 that stores a plurality of data objects 1-*k* in at least one memory 921 of the object storage system. At least one edge node 910 can communicate with the object storage system, for example, via a network 924.

Some or all edge nodes 910 can be implemented by utilizing a computing device 16 and/or a user device 14 of FIG. 1. Alternatively or in addition, some or all edge nodes 910 can include a computing core 26 and/or can include at least one processor and memory. The network 924 can be implemented by utilizing the network 24 of FIG. 1 and/or can be implemented by utilizing any wired and/or wireless communication between access layer 922 and edge nodes 910. The object storage system 920 can be implemented by utilizing the cloud computing environment of FIG. 11.

Some or all of edge nodes 910 can be a subset of a plurality of nodes of the cloud computing environment of the object storage system. While the edge nodes 910 are depicted separately from the object storage system in FIG. 9A, the edge nodes 910 can be components of the object storage system, such as outermost nodes of a plurality of nodes of the object storage system, operable to store and/or retrieve data from storage units and/or deeper nodes of the object storage system via network 924 and/or a network of the object storage system and/or further to communicate with client devices and/or user devices as the outermost nodes of the object storage system. Alternatively, some or all the edge nodes 910 can be entirely separate from the object storage system, and are only operable to communicate with the object storage system via access layer 922.

The memory 921 of the object storage system 920 can be implemented by utilizing DSN memory 22 and/or a plurality of storage units 36 to store the plurality of data objects 1-*k*. The memory 921 can otherwise include at least one other memory device operable to store the plurality of data objects 1-*k*. The object storage system 920 can include an access layer 922 that is operable to communicate with a plurality of requesting entities, for example, by storing data received from the edge node in deeper elements of the object storage system and/or within the storage units 36 of the object storage system, and/or by retrieving data objects stored in the deeper elements and/or storage units for transmission to one or more requesting entities. The access layer 922 can include at least one processor and memory, and can include the computing core 26 of FIG. 2. For example, the access layer 922 can be implemented by utilizing at least one computing device 16 of FIG. 1. In some embodiments, the access layer includes multiple elements such as multiple computing devices 16, and different requesting entities can transmit and receive communications from different elements of the access layer.

The access layer 922 can be operable to communicate with storage units or other memory of the object storage system 920 to store and retrieve data object via a network of the object storage system 920. The object storage system can utilize the network 24 of FIG. 1 to enable access layer 922 to store and/or retrieve data objects from the plurality of storage units via the network 24. Alternatively or in addition, network 924 and/or can be integrated within the object storage system 920 to facilitate communication between the access layer and storage of the object storage system. Alternatively or in addition, a different wired and/or wireless network can be utilized within the object storage system 920 to facilitate communication between the access layer and storage of the object storage system. In some embodiments, the network 924 is implemented by utilizing a CDN (content delivery network) and/or a wide area network, utilized to deliver content from the object storage system 920 to requesting edge nodes 910.

In some embodiments, some or all data objects are dispersed stored by the object storage system 920 in a plurality of storage units as discussed in conjunction with FIGS. 3-8. Alternatively, some or all data objects are not dispersed stored, and are, for example, stored in each stored in a single location of the object storage system 920. The access layer 922 can be operable to perform a dispersed storage error encoding function on data segments of a data object received via network 924, for example, from an edge node 910 for storage. Alternatively, the access layer 922 can receive the encoded data slices from an edge node 910 via network 924, where the edge node 910 performed the dispersed storage error encoding function on data segments of the data object to generate the encoded data slices transmitted to the access layer 922. To store the data object, the access layer 922 can transmit the generated and/or received encoded data slices to an information dispersal algorithm (IDA) width threshold number of storage units in the object storage system 920 for storage, for example, via network 24.

The access layer 922 can retrieve at least an IDA decode threshold number of encoded data slices of each data segment of a stored data object from at least a corresponding IDA decode threshold number of storage units of the object storage system 920, for example, in response to a request to retrieve the data object received from an edge node 910 via network 924. The access layer 922 can utilize one or more of these computing devices 16 to perform a dispersed storage error decoding function on the retrieved encoded data slices to regenerate the requested data object, and can transmit the requested data object to the edge node 910. Alternatively, the access layer 922 can transmit the retrieved encoded data slices to the edge node 910, and the edge node can perform the dispersed storage error decoding function on the encoded data slices received from the access layer to regenerate the requested data object itself.

Figure 9B:
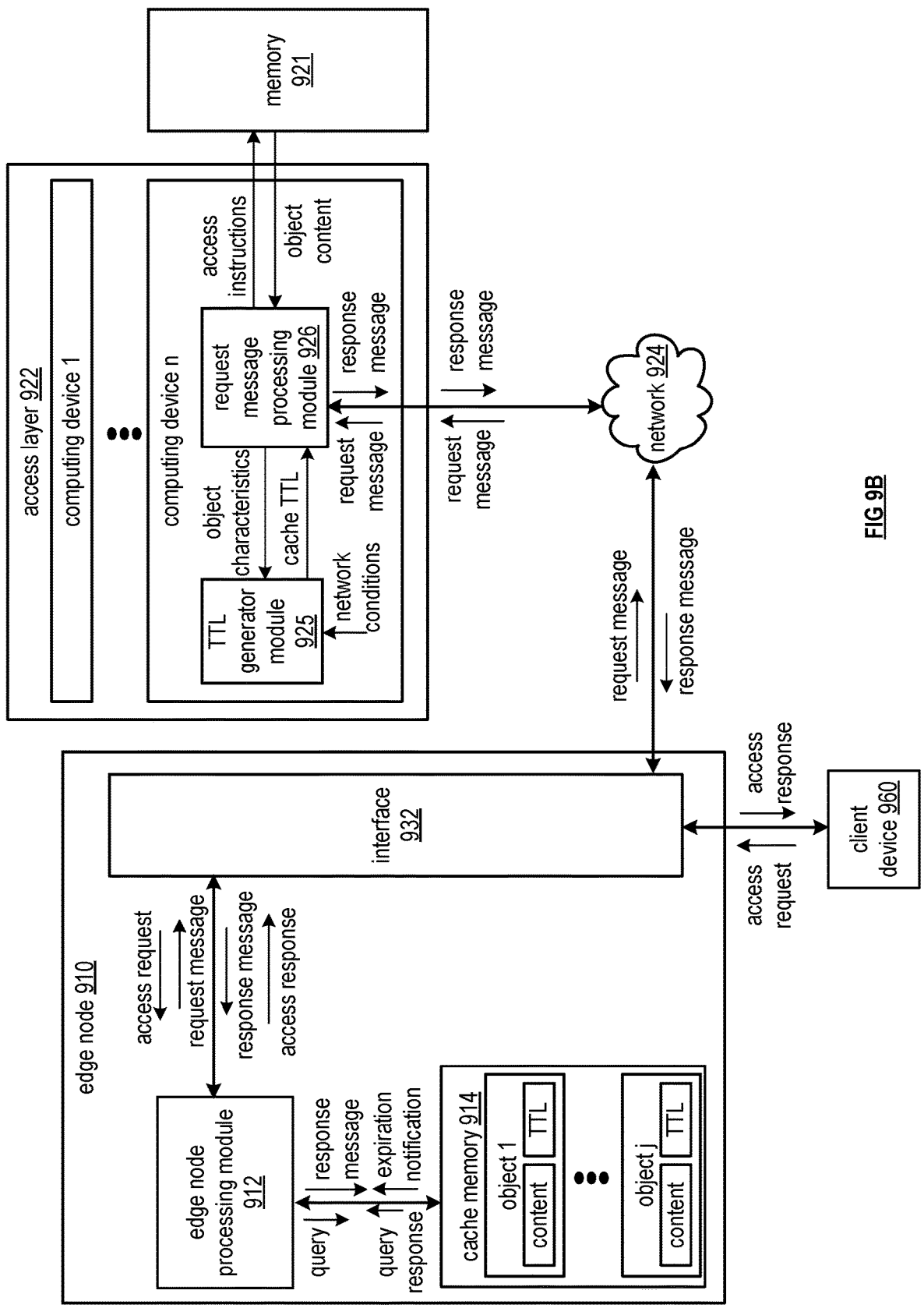
FIG. 9B is a schematic block diagram of an embodiment of an object storage system communicating with an edge node in accordance with the present invention.

FIG. 9B presents an illustration of an edge node 912 communicating with one of a plurality of computing devices 1-*n* within access layer 922 of the object storage system 920. The edge node 910 can generate request messages via an edge node processing module that utilizes at least one processor of the edge node 910. For example, a request message can be generated based on receiving a corresponding access request, via an interface 932, from a client device 960 directly and/or via network 924.

Request messages can be transmitted by the edge node 910 to a particular computing device of the access layer 922. For example, the particular computing device n that receives the request message can be a dedicated computing device within the access layer for request messages received from the edge node 910. Alternatively, an interface of the access layer can determine which one of the n computing devices will process the request message based on current processing constraints of the computing devices, based on determining which computing devices manages storage devices dedicated for storage of the requested object, and/or based on other factors.

Once the particular computing device receives the request message, a request message processing module 926 of the computing device can be implemented by utilizing at least one processor of the computing device, and can execute the access indicated in the request message. For example, the request message processing module 926 can facilitate retrieval and/or writing an object indicated in the request message from and/or to memory 921 by transmitting access instructions to one or more storage units of memory 921 and by receiving object content and/or other confirmation of execution of the access in response. The request message processing module 926 can transmit a response message via network 924 to the edge node 910, which can be utilized by the edge node processing module 912 to generate a corresponding access response for transmission to the client device 960.

In an object storage system such as a DSN memory, the latency for high bandwidth and real-time content and/or data can be high. This can be caused by the access layer in the storage system having to rebuild sources from slices of data, and having to send the data to the requesting clients over public wide area networks, depending on the location of the client and the rest points of the content or data. This is not ideal to deliver high bandwidth, low latency data for real-time applications such as video playback or retrieval of large image files for rendering in a browser. Object storage system can support CDN networks that can cache the needed content at edge locations close to clients in order to deliver the content and/or data quickly. In existing systems, the time to live (TTL) settings for caching at the edge nodes is largely static and can be configured by system operators based on average or expected latency. Furthermore, in existing systems, the TTL configuration does not take into account real-time traffic, system conditions to determine the cache, TTL settings at edge locations, frequency of updates to objects etc. The object storage system 920 as presented in FIGS. 9A-9D overcomes these issue by presenting improvements to existing systems.

In an object storage system 920, such as a DSN memory 22, the access layer 922 can be operable to compute a cache TTL for CDN. In particular, as illustrated in FIG. 9B, a computing device within the access layer 922 can compute the cache TTL in response to receiving and/or executing a request message transmitted by an edge node 910. A TTL generator module 925 can be implemented by utilizing at least one processor of the computing device, and can be utilized to calculate or otherwise determine a TTL for one or more objects of a received request message. Once the TTL is computed by the TTL generator module 925, the TTL can be included in the response message generated by the request message processing module 926. In particular, cache-control header value of the response message can include or otherwise indicate the computed TTL, for example, in seconds, and/or can indicate a time that storage of the object should expire in cache 914 of the edge node 910. For example, the TTL can be inserted as a cache-control header value as part of a top-edge Amazon Simple Storage Service (S3) application programming interface (API) response builder process performed by the access layer 922.

The cache TTL can be computed based on various factors determined by the TTL generator module 925. For example, real-time conditions for traffic over the network 924 and/or the conditions within the object storage system 920 to retrieve and build the source data for delivery can be utilized to calculate the cache TTL. As illustrated in FIG. 9B, these current network conditions, such as a determined end-to-end transfer latency between the computing device and the edge node, and/or between the computing device and one or more storage units in which the request object is stored, can be retrieved and/or otherwise determined by the TTL generator module 925, where the TTL is calculated as a function of these current network conditions.

As illustrated in FIG. 9B, the TTL generator module 925 can further receive and/or determine object characteristics of the object indicated in the request message, and the TTL can be calculated as a function of these object characteristics. These object characteristics can be determined based on the object identified in the received request message, and can include the frequency at which the object is updated and/or overwritten in memory 921, the content size and/or length of the object, the type of content of the object, and/or other characteristics of the object itself.

The cache TTL can alternatively or additionally be computed as a function of one or more other factors. These other factors can include the frequency of updates for all objects stored in the object storage system 920. Alternatively or in addition, these other factors can include the type of access request requested, where the cache TTL is computed differently for read requests and write requests. Alternatively or in addition, these other factors can include the location of the edge node 910 with respect to network 924; a region endpoint of the computing device within the access layer 922; scorecards stored by the computing device, for example, indicating a score and/or ranking of the computing device relative to scores and/or rankings of the plurality computing devices 1-$n$; and/or the network latency between the requesting edge node and the particular computing device.

By having the cache TTL determined based on real-time conditions and frequency of object updates, network 924 and/or the object storage system, and/or a CDN network in a public cloud system can have more optimal performance, while optimizing network transfer for cached content. In particular, the TTL can correspond to longer durations when network conditions are slower, when the size of the object is larger, and/or the update frequency of the object is less frequent. The TTL can thus correspond to shorter durations when network conditions are faster, when the size of the object is smaller, and/or the update frequency of the object is more frequent.

The edge node can receive the response message and can extract the cache TTL from the response message. If the response message include object content in response to a read request, the object can be stored in cache memory 914. The cache memory 914 can further store the cache TTL for each object and/or the edge node can otherwise manage the cache memory 914 to retain objects for the time indicated in the corresponding cache TTL extracted from the response message that included the object. As illustrated in FIG. 9B, the cache 914 stores a objects 1-$j$ retrieved from the object storage system via one or more response messages received in response to one or more request messages generated by the edge node 910. These objects are stored as a result of their corresponding TTL indicating that they have not yet expired. Once these objects are determined by the edge node to be expired, for example, based on an expiration time indicated by the TTL being equal to or greater than a current time, the edge node can facilitate their deletion from cache memory 914.

While these objects 1-$j$ are stored in cache memory 914, they can be directly accessible by one or more client devices 960 that send access requests for the object to the edge node 910. For example, as illustrated in FIG. 9B, the edge node processing module can query the cache memory 914 in response to receiving an access request from client device 960 to read an object. If the object exists in cache memory, the edge node can include this cached object in a response to the client device 960, and requesting the object from the object storage system 920 via a request message is not necessary in these cases. In such embodiments, the request message is generated for transmission to the computing device within access layer 922 only when the corresponding object is determined not to be already stored in cache memory 914 and/or only when the corresponding object has a TTL indicating that access of the object in cache memory has expired.

In some embodiments, the edge node 910 can manage and/or monitor the TTLs for stored objects to automatically determine when cached objects have expired, when cached objects are going to expire soon, and/or when cached objects are going to expire within a determined timeframe, such a timeframe that retrieval of the corresponding object from the object storage system 920 is expected to take. This can be utilized to ensure objects remain up-to-date in cache and/or to ensure that updated objects are retrieved before expiration of a corresponding currently stored object occurs.

As illustrated in FIG. 9B, the edge node processing module can perform this monitoring to receive and/or determine expiration notifications for corresponding objects in response to these objects being determined to have expired, to expire soon, and/or to expire within the determined timeframe. In response to receiving and/or otherwise determining the expiration notification, the edge node processing module 912 can automatically transmit a request message for the corresponding object to the access layer, and a computing device within the access layer can generate a response message that includes the current version of the object and a newly calculated cache TTL for the object. The edge node can receive the response message, and can store the updated version of the object included in the response message in cache 914 for a time period in accordance with the newly calculated cache TTL extracted from the response message. This process can continue, where subsequent requests for updated versions of the object are automatically generated based on the corresponding cache TTL for the currently cached object indicating expiration has occurred, will occur soon, and/or that a newly updated object should be requested to ensure its retrieval occurs before expiration of the currently stored object.

As one example, the cache TTL can be computed as a function of update frequency. The update frequency can be reflected by calculating an average time between updates. In some embodiments, this can include subtracting the time the data object was last modified, for example on average, from the current time:

Average time between updates=Current time−Object Last Modified Time Average

The average time between updates can be determined by tracking a time between each pair of consecutive updates over time. The average time between updates is calculated as a computed average across all of these tracked times. This can include utilizing only updates performed within a predetermined, sliding time window from the current time. Utilizing this predetermined, sliding time window can be ideal in ensure the update frequency is based only on recent accesses. Alternatively or in addition, the update frequency can be determined based on tracking a number of updates performed over time and dividing by a predefined period. The number of updates tracked can similarly be tracked only if they fall within the predefined sliding time window.

In some embodiments, the update frequency can be instead determined conservatively, for example, where a shortest time between consecutive updates within the predetermined sliding time window is utilized instead of the average time between all consecutive updates and/or where the average time between updates is weighted to favor and/or more heavily weight the shorter times between consecutive updates. In some embodiments, the update frequency can be further estimated and/or adjusted based on computing an average update frequency for similar data objects stored in memory, such as data objects of the same type, owned by the same entity, and/or data objects that otherwise have similar characteristics.

In some embodiments, a plurality of quantized update frequency groupings can each have a corresponding predetermined TTL. The TTL of a requested data object can computed based on determining the update frequency of the requested object, and by setting the TTL to the TTL of the one of the plurality of quantized update frequency groupings that the determined update frequency of the requested object falls within. In a particular example determining computing cache TTL based on update frequency, three update frequency levels can be utilized: a high update frequency level, a medium update frequency level, and a low update frequency level. For example, the high frequency level can correspond to an update frequency of less than or equal to one update per a first time period, such as less than or equal to once every twenty four hours or less. The low frequency level can correspond to an update frequency of no more than once per a second time period that is longer than the first time period, such as an update frequency of no more than once per three days. The medium frequency level can correspond to an update frequency of less than one update per the first time period, but more than one update per the second time period, such as an update frequency that is less than once every twenty-four hours, but more than once every three days.

Retrieved objects determined to have update frequencies corresponding to the high frequency level can have their TTL set equal to a fixed high-frequency cache TTL duration, such as a TTL duration of three hours; a TTL that is less than the duration of the first time period; or another predetermined duration. Retrieved objects determined to have update frequencies corresponding to the low frequency level can have their TTL set equal to a fixed low-frequency cache TTL duration, such as a TTL duration of three days; a TTL that is less than or equal to the duration of the second time period and/or a duration that is greater than the fixed high-frequency cache TTL value; or another predetermined duration. Retrieved objects determined to have update frequencies corresponding to the medium frequency level can have their TTL set equal to a fixed medium-frequency cache TTL duration, such as a TTL value of one day; a TTL that is less than or equal to the duration of the second time period, that is that is less than or equal to the duration of the second time period, that is greater than or equal to a duration of the first time period, and/or that is greater than the fixed high-frequency cache TTL value and less than the fixed low-frequency cache TTL value; and/or another predetermined duration.

Similarly, in embodiments with more than three of these quantized update frequency levels, levels corresponding to higher frequencies can have corresponding TTL durations with shorter durations, where any first level corresponding to a higher update frequency than the update frequency of a second level will have a corresponding TTL duration that is strictly shorter than the TTL duration of the second level.

This mechanism can help ensure that objects that are frequently updated in the object storage system remain as up-to-date as possible in the cache of an edge node, while not requiring the edge node to retrieve infrequently updated objects to update the cache more often than necessary.

In some embodiments, rather than corresponding to one of a predefined set of fixed TTL durations for a corresponding set of quantized update frequency levels, the TTL is dynamic. In particular, the TTL can be dynamic for very frequently updated objects. For example, if the update frequency of the requested object is determined to be greater than a predetermined maximum frequency threshold, the TTL can further be computed as a function of additional factors. In particular, the TTL can be computed to take into account not only the expected time until next update, but to further take into account the expected time taken to facilitate all of the steps of the next update, as the time to take each of these steps holds substantially greater weight when the time between updates is very small. In such cases, the predetermined maximum frequency threshold can be determined based on a corresponding timeframe between updates determined to be the minimum timeframe where the time taken to perform the additional steps is still negligible. This ensures these additional steps are taken into account in calculating TTL when the timeframe between updates on average is smaller than the minimum timeframe between updates, and thus when the time taken to perform the additional steps is determined to be non-negligible.

These additional steps can include an external network transfer time, which can correspond to the time taken for the network 924 transmit the entire data object from an edge node 910 to the computing device, for example, based on current network conditions of network 924. This external network transfer time can be computed based on the edge node to computing device latency (or vice versa), which can be determined based on an actual request and/or response latency (EXT_RL) for transfer of the 1st byte of the request and/or response message, respectively (EXT_RL), for example from existing metrics supported in the computing device. The external network transfer time can be computed based on the content-length (CL) of the object, either provided in the header received from the edge node in a request message corresponding to a write request, or from the metadata of the object retrieved in response to performing a read request. For example, the external network transfer time can be computed as the latency multiplied by the content-length, for example, where the latency is in milliseconds and/or where the content-length in bytes is first divided by 65536:

External Network Transfer Time=(EXT_RL*CL/65536)

These additional steps can include an internal slice read and/or write time, which can correspond to an amount of time to read the data object to memory 921 for a request message corresponding to a read request and/or the time to write the data object to memory 921 for a request message corresponding to a write request. This can include utilizing an average and/or expected time it takes to get to performance threshold in real-time (DS_RTT), for example, from storage units of the memory 921. This can include determining a latency between the computing device and each of a plurality of storage units that dispersed store the data object as a plurality of encoded data slices, and utilizing the maximum latency of this plurality of latencies. This can include further utilizing the content length of the data object. For example, the internal slice read and/or write time can be computed as time taken to get to performance threshold in real-time multiplied by the content-length, where the content-length is in bytes and is and is first divided by 4 megabytes, and where the time taken to get to performance threshold is in milliseconds:

Internal Slice Write or Read Time=(CL/(4 MB)*DS_RTT)

These additional steps can include an internal information dispersal algorithm IDA or reverse IDA time. This can include utilizing the average and/or expected time to apply an IDA to generate a plurality of encoded data slices from a data segment or an entire data object to be written to memory for a request message corresponding to a write request. This can include utilizing the average and/or expected time to apply a reverse IDA on a plurality of encoded data slices to obtain a data segment or entire data object. The content-length can again be utilized to determine the entirety of time expected to be required to dispersed storage error encode or dispersed storage error decode the entire content of the data object in memory. For example, the required time to dispersed storage error encode and/or decode a data segment or other unit to and/or from a plurality of encoded data slices, respectively, (IT) can be multiplied by the content-length, where the content-length is in bytes and is first divided by 4 megabytes, and where the required dispersed storage error encode and/or decode time is in milliseconds:

Internal IDA or reverse IDA time=(CL/(4 MB)*IT)

Some or all of these additional steps can be in addition to expected time between updates, such as the calculated average time between updates and/or period between updates as reflected by a calculated update frequency, as discussed above. For example, the TTL can be computed as a function of all of these factors, where the time taken to perform all of these steps is taken into account and/or where the computed TTL included in the cache-control header of the response message is equal to or otherwise based on the duration expected in performing all of these steps:

TTL=External Network Transfer Time+Internal slice Write or Read Time+Internal IDA or Reverse IDA Time+Average Time Between Updates For example, substituting in the particular calculations discussed in the example embodiments discussed above yields the following calculation:

TTL=(EXT_RL*CL/65536)+(CL/(4 MB)*DS_RTT)+ (CL/(4 MB)*IT)+(Current time−Object last modified time average)

In some embodiments, some or all of this information is communicated to the edge nodes 910 in the response message and/or the edge nodes 910 are operable to calculate and/or determine some or all of these values. In particular, the external network transfer time, internal slice write or read time, and/or the internal IDA or reverse IDA time can be useful for an edge node 910 in setting the determined timeframe discussed above, utilized to determine when to facilitate retrieval of an updated data object for a currently stored data object in cache, as a function of the TTL of the currently stored data object in cache and the determined timeframe. In particular, the determined timeframe can be calculated to reflect expected roundtrip retrieval of the updated data object by the edge node based on, for example, a sum of twice the external network transfer time, the internal slice write or read time, and the internal IDA or reverse IDA time. The edge node 910 can then facilitate transmission of the request message for an updated version of the expiring data object at a time that is exactly or substantially the duration of determined timeframe before the expiration time indicated by the TTL. In some embodiments, the edge node can extract the external network transfer time, internal slice write or read time, and/or the internal IDA or reverse IDA time from the TTL and/or the response message. Alternatively, the response message can indicate the external network transfer time, internal slice write or read time, the internal IDA or reverse IDA time, and can separately indicate average time between updates. The edge node can compute the TTL itself by summing these separate elements, and can use the external network transfer time, internal slice write or read time, and/or the internal IDA or reverse IDA time to compute the determined timeframe before expiration of the data object in which the request to update should be transmitted.

Figure 9C:
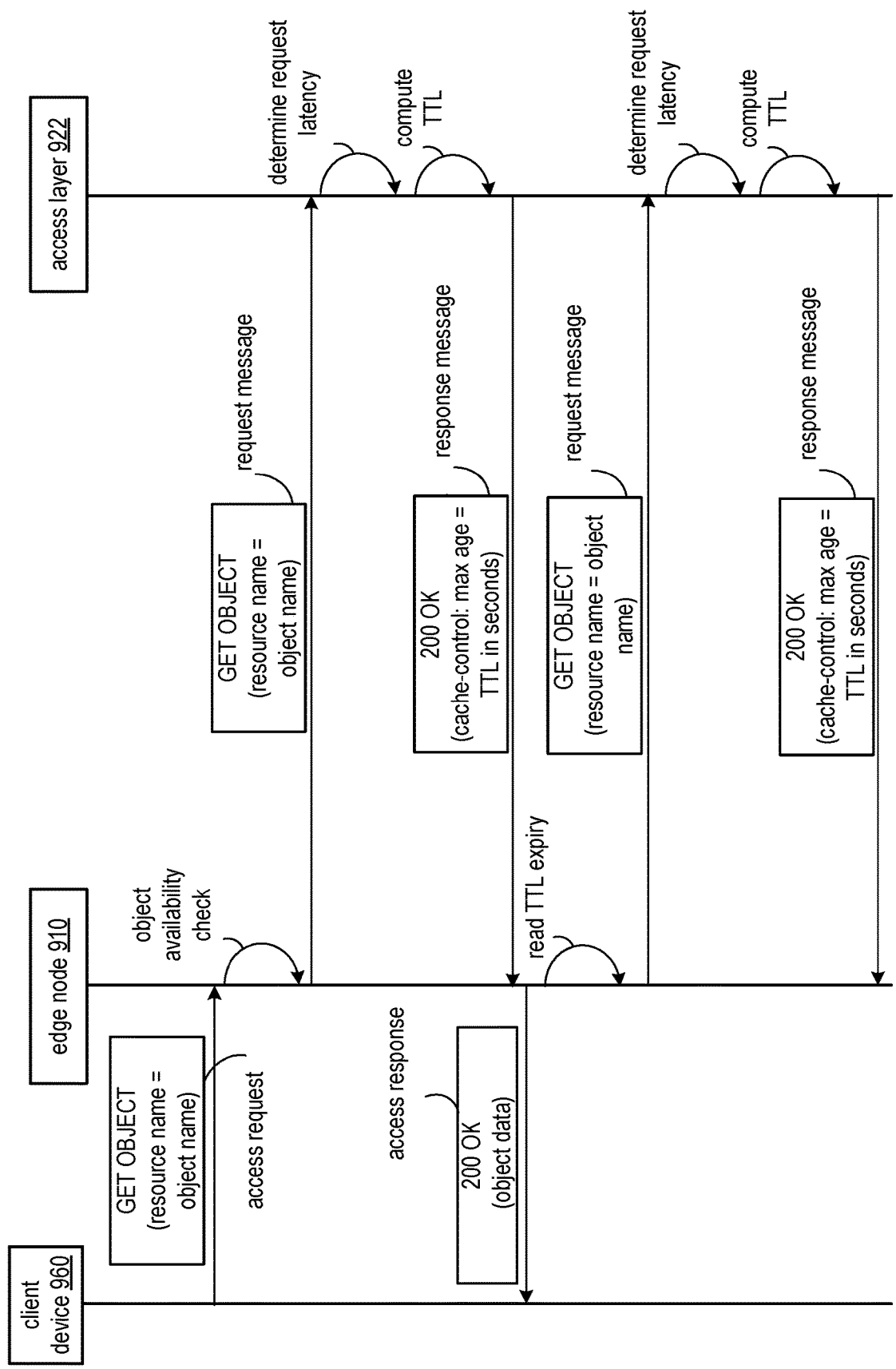
FIG. 9C is a flow diagram of an embodiment of an access layer of an object storage system communicating with an edge node in accordance with the present invention.
Figure 9D:
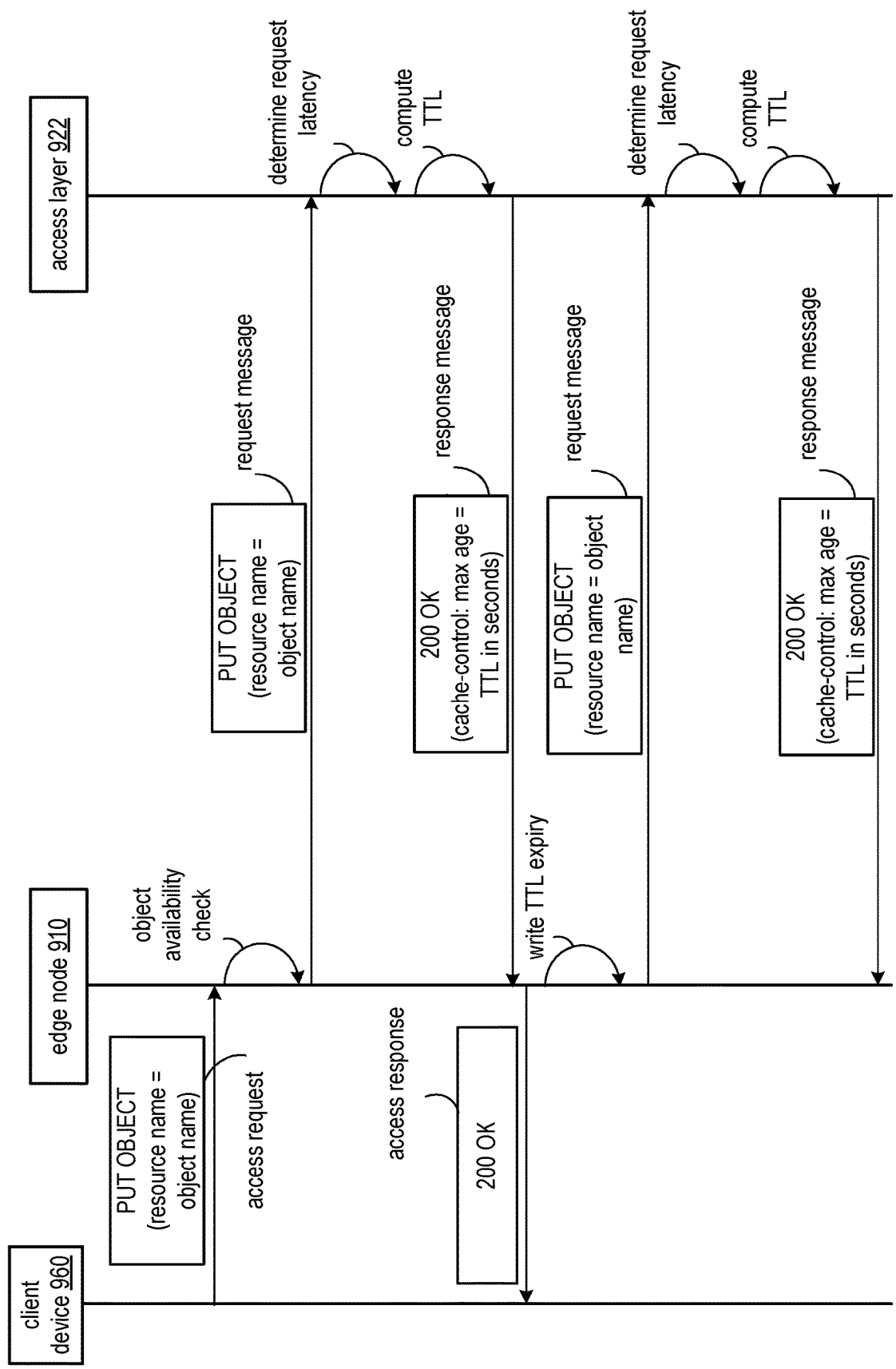
FIG. 9D is a flow diagram of an embodiment of an access layer of an object storage system communicating with an edge node in accordance with the present invention.

FIGS. 9C and 9D illustrate communication flow between an edge node 910 and access layer 922 for object reads and object writes, respectively. In particular, the functionality of access layer 922 illustrated in FIGS. 9C and 9D can be performed by a particular computing device of the access layer that communicates with the edge node as discussed in conjunction with FIG. 9B. The edge node 910 can receive an access request from client device 960 indicating an object name of the request object. The access request can correspond to GET OBJECT as illustrated in FIG. 9C or a PUT OBJECT request as illustrated in FIG. 9D. The edge node 910 can determine whether or not the object is available locally in cache, for example, by querying the cache as discussed previously. If the object is not available locally, a request message can be transmitted to the access layer 922 that includes the GET OBJECT request as illustrated in FIG. 9C, or the PUT OBJECT request as illustrated in FIG. 9D. The access layer 922 can determine the request latency of the request, for example to determine the external network transfer time and/or to determine the edge node to computing device latency. This can be utilized to compute the TTL in conjunction with other factors discussed herein. The request can be executed and the TTL can be included in a response message. For example, the response message can correspond to a 200 OK and can indicate the TTL in seconds as a max age of a cache-control value. The edge node can relay the response message to the client device and can update its cache accordingly. For example, as illustrated in FIG. 9C, a response to a GET OBJECT request can include the object content in addition to the TTL, and the object content can be stored in the cache for a time period indicated by the TTL. The expiry of the TTL can be read, and in response to the expiration of the TTL being determined to occur, the request message to read and or write an updated version of the data object can be transmitted as a GET OBJECT request and/or PUT OBJECT request. The access layer 922 can similarly receive the new request message, and can compute an updated TTL based on the most recent conditions as discussed herein, such as a newly determined request latency determined for receipt of this new request message. The response message can include the newly computed TTL, which can be different from the prior TTL of the previous response.

In various embodiments, a computing device of an access layer of an object storage system includes at least one processor and a memory that stores operational instructions, that when executed by the at least one processor cause the processing system to receive, via a network, a request message from an edge node, where the request message indicates a requested access of a data object. An update frequency of the data object is determined in response to receiving the request message, and a cache time to live (TTL) is determined based on the update frequency. Performance of the requested access of the data object is facilitated in response to receiving the request message, and a response message that includes the cache TTL is generated in response to performing the requested access. The response message is transmitted to the edge node via the network.

Figure 10:
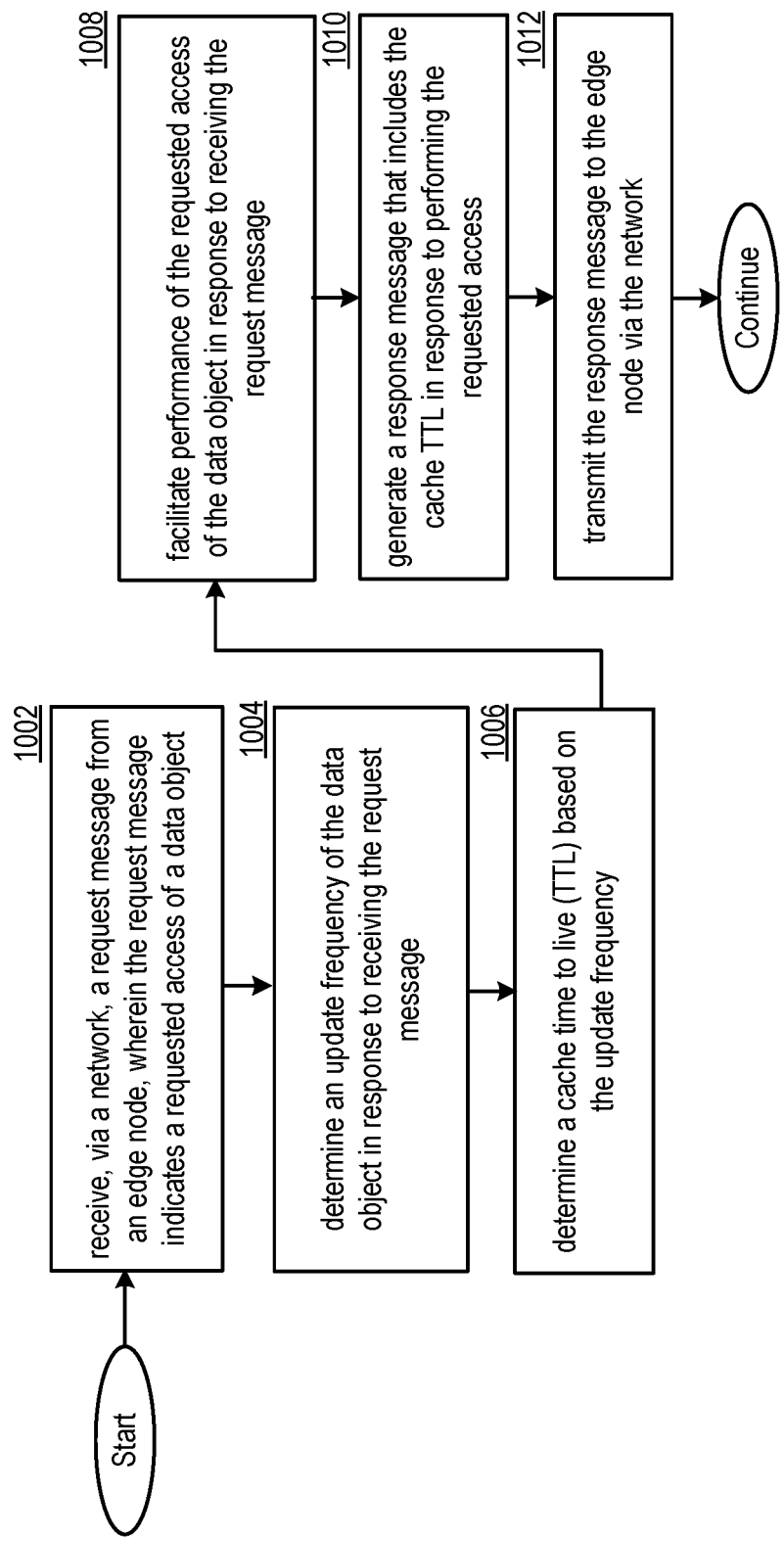
FIG. 10 is a logic diagram of an example of a method of determining cache time to live in accordance with the present invention.

FIG. 10 is a flowchart illustrating an example of determining cache time to live. In particular, a method is presented for use in association with one or more functions and features described in conjunction with FIGS. 1-9D, for execution by a computing device within an access layer of an object storage system that includes a processor, or via another processing system of an object storage system and/or dispersed storage network that includes at least one processor and memory that stores instruction that configure the processor or processors to perform the steps described below.

Step 1002 includes receiving, via a network, a request message from an edge node. The request message indicates a requested access of a data object, such as a request to read the object from the object storage system or to write the object to the object storage system, for example, by updating an existing object in the object storage system. Step 1004 includes determining an update frequency of the data object in response to receiving the request message. For example, determining the update frequency can include calculating an average time period between consecutive updates to the data object by a plurality of edge nodes. Such updates may have been facilitated by the computing device in response to previous request messages received from the plurality of edge nodes indicating write requests to update the data object in the object storage system.

Step 1006 includes determining a cache time to live (TTL) based on the update frequency. For example, each of a plurality of quantized update frequency levels can correspond to one of a plurality of fixed cache TTLs. The duration of the fixed cache TTLs can decrease as the corresponding update frequency of consecutive quantized update frequency levels increases. In this fashion, any quantized update frequency level corresponds to one of the plurality of fixed cache TTLs that has a shorter duration than all other ones of the plurality of fixed cache TTLs corresponding to other ones of the quantized update frequency level with lower update frequencies than the any quantized update frequency level. Determining the cache TTL can include determining one of a plurality of quantized update frequency levels that corresponds to the update frequency of the data object, and can further include selecting one of the plurality of fixed cache TTLs that corresponds to the one of a plurality of quantized update frequency levels.

Alternatively or in addition, the cache TTL can be determined as a function of other factors in addition to the update frequency. For example, the method can further include measuring a request latency corresponding to receipt of the request message via the network, where the cache TTL is determined as a function of the update frequency and the request latency.

Alternatively or in addition, object storage system can include a dispersed storage network (DSN) memory, where the data object is dispersed stored in the DSN memory as a plurality of encoded data slices. The requested access can corresponds to a read request. Determining the cache TTL can include calculating, estimating, and/or otherwise determining an external network transfer time based on receipt of the request message via the network. Determining the cache TTL can further include calculating, estimating, and/or otherwise determining an internal slice read time corresponding to a time for the computing device to retrieve at least a read threshold of the plurality of encoded data slices of the data object from a plurality of storage units of the DSN memory. Determining the cache TTL can further include calculating, estimating, and/or otherwise determining an internal reverse information dispersal algorithm (IDA) time corresponding to a time for the computing device to perform a reverse IDA on at least the read threshold of the plurality of encoded data slices to reproduce the data object. The cache TTL can be calculated by summing the external network transfer time, the internal slice read time, the internal reverse IDA time, and/or the average time period between subsequent updates to the data object. In various embodiments, the method further includes determining a length of content of the data object, where the external network transfer time, the internal slice read time, and/or the internal reverse IDA time are each calculated as a function of the length of the content of the data object.

Alternatively or in addition, the requested access can corresponds to a write request to write the data object to the DSN memory. Determining the cache TTL can include calculating, estimating, and/or otherwise determining an external network transfer time based on receipt of the request message via the network. Determining the cache TTL can further include calculating, estimating, and/or otherwise determining an internal IDA time corresponding to a time for the computing device to perform an IDA on the data object to generate a plurality of encoded data slices. Determining the cache TTL can further include calculating, estimating, and/or otherwise determining an internal slice write time corresponding to a time for the computing device to transmit the plurality of encoded data slices of the data object to a plurality of storage units of the DSN memory. The cache TTL can be calculated by summing the external network transfer time, the internal IDA time, the internal slice write time, and/or the average time period between subsequent updates to the data object. In various embodiments, the method further includes determining a length of content of the data object, where the external network transfer time, the internal slice write time, and/or the internal IDA time are each calculated as a function of the length of the content of the data object.

The method can further include step 1008, which includes facilitating performance of the requested access of the data object in response to receiving the request message. This can be performed before, after, and/or concurrently to the update frequency being determined and/or the TTL being calculated. Step 1010 includes generating a response message that includes the cache TTL in response to performing the requested access. Step 1012 includes transmitting the response message to the edge node via the network.

In various embodiments, the requested access corresponds to a read request, the response message includes content of the data object, and the edge node stores the content of the data object in cache memory for a duration indicated by the cache TTL.

In various embodiments, the method can further include receiving via a network, a second request message from the edge node. The second request message can indicate the requested access of the data object, where the edge node transmitted the second request message in response to determining a duration indicated by the cache TTL has expired. The method can further include determining a new update frequency of the data object in response to receiving the second request message, where the new update frequency is higher than the update frequency. The method can further include determining a new cache TTL based on the new update frequency, where the new cache TTL corresponds to a shorter duration than the cache TTL in response to the new update frequency being higher than the update frequency. The method can further include generating a second response message that includes the cache TTL. The method can further include transmitting the second response message to the edge node via the network.

In various embodiments, a non-transitory computer readable storage medium includes at least one memory section that stores operational instructions that, when executed by a processing system of an object storage system and/or a dispersed storage network (DSN) that includes a processor and a memory, causes the processing system to receive, via a network, a request message from an edge node, where the request message indicates a requested access of a data object. An update frequency of the data object is determined in response to receiving the request message, and a cache time to live (TTL) is determined based on the update frequency. Performance of the requested access of the data object is facilitated in response to receiving the request message, and a response message that includes the cache TTL is generated in response to performing the requested access. The response message is transmitted to the edge node via the network.

Figure 11:
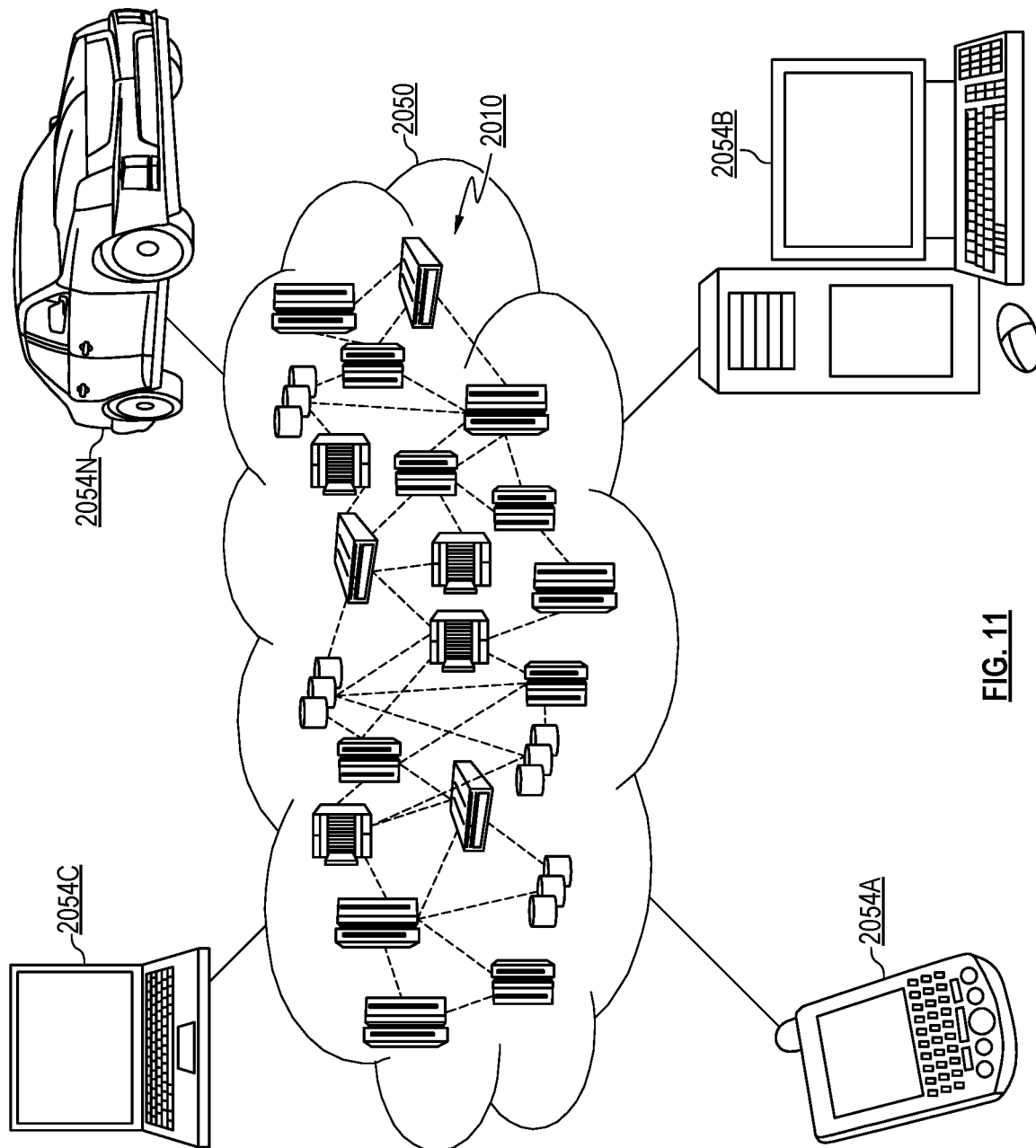
FIG. 11 depicts a cloud computing environment according to an embodiment of the present invention.

FIG. 11 presents an illustrative cloud computing environment 2050. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 11 are intended to be illustrative only and that computing nodes 2010 and cloud computing environment 2050 can communicate with any type of computerized device over any type of network and/or network addressable connection (e.g., using a web browser).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

In various embodiments, the DSN can be implemented by utilizing the cloud computing environment 2050 and/or can communicate with cloud computing environment 2050. Alternatively or in addition, the plurality of computing devices 12-16 of FIG. 1, the managing unit of FIG. 1, and/or the integrity processing unit 20 of FIG. 1, and/or storage units 36 can be implemented by utilizing cloud computing nodes 2010, personal digital assistant (PDA) or cellular telephone 2054A, desktop computer 2054B, laptop computer 2054C, and/or automobile computer system 2054N. In various embodiments, the cloud computing nodes 2010, personal digital assistant (PDA) or cellular telephone 2054A, desktop computer 2054B, laptop computer 2054C, and/or automobile computer system 2054N can communicate by utilizing network 24 of FIG. 1.

Figure 12:
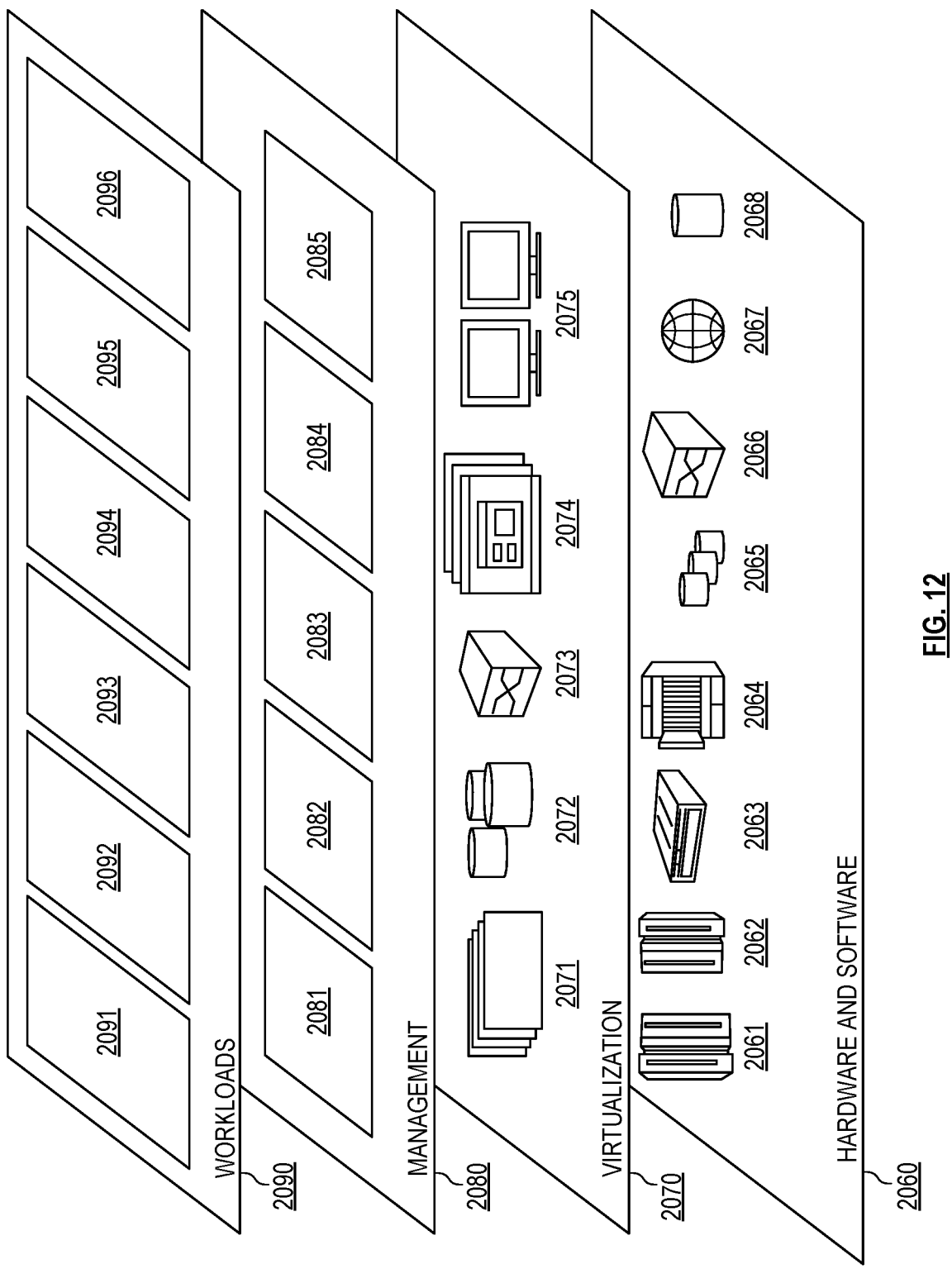
FIG. 12 depicts abstraction model layers according to an embodiment of the present invention.

Referring now to FIG. 12, a set of functional abstraction layers provided by cloud computing environment 2050 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068. In some embodiments, one or more hardware components can be implemented by utilizing the computing device 2300 of FIG. 13.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and cache TTL setting 2096.

In some embodiments, the DSN 10 and/or the object storage system 920 can utilize utilizing the cloud computing environment 2050, for example, by utilizing the cache TTL setting 2096 of the workloads layer 2090 of FIG. 12 to determine and/or set the cache TTL for response messages to access requests received in the DSN and/or in the object storage system 920 as described in conjunction with FIGS. 1-10. Some or all computing devices 12-16 of FIG. 1 and/or edge nodes 910 of FIG. 9A can be implemented by utilizing a cloud computing node 2010 and/or can otherwise be operable to communicate with the object storage system 920 via a corresponding node 2010 of the cloud computing environment 2050. Alternatively or in addition, the object storage system 920 can be implemented by utilizing the cloud computing environment 2050 and/or by utilizing a plurality of cloud computing nodes 2010. For example, the access layer 922 can be implemented by utilizing one or more corresponding cloud computing nodes 2010. In some embodiments, edge nodes 910 and/or client device 960 can be implemented by utilizing a computing device used by cloud consumers, such as, for example, personal digital assistant (PDA) or cellular telephone 2054A, desktop computer 2054B, laptop computer 2054C, and/or automobile computer system 2054N.

Figure 13:
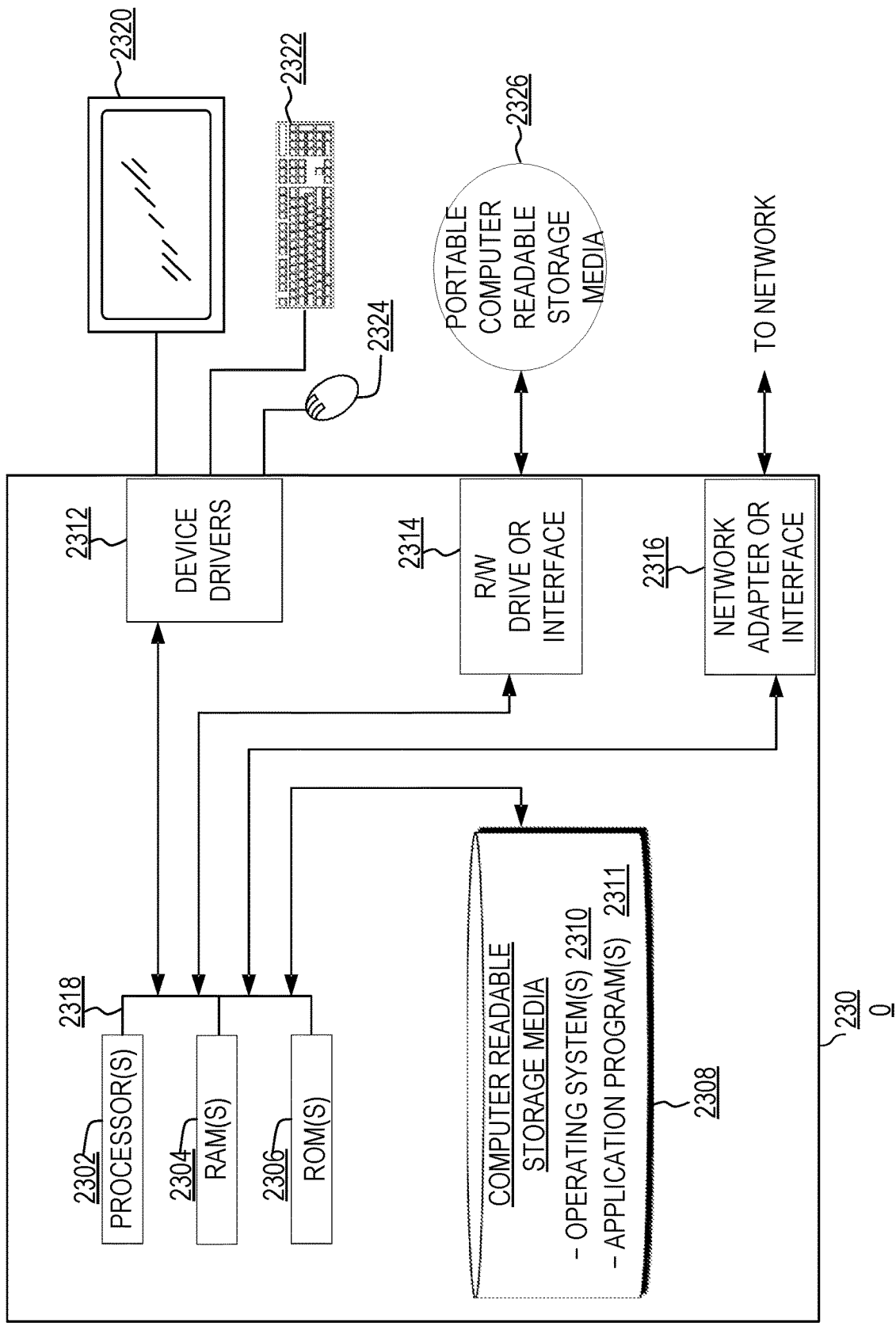
FIG. 13 depicts a block diagram of a computing device according to various embodiments of the present invention.

FIG. 13 depicts a block diagram of components of a computing device 2300, which can be utilized to implement some or all of the cloud computing nodes 2010, some or all of the computing devices 54A-N of FIG. 11, and/or to implement other computing devices described herein in accordance with an embodiment of the present invention. The computing device 2300 can be utilized to implement some or all of the plurality of computing devices 12-16 of FIG. 1, the DS client module 34 of FIG. 1, the managing unit of FIG. 1, the integrity processing unit 20 of FIG. 1, and/or storage units 36 of FIG. 1. For example the computing core 26 of FIG. 2 can be implemented by utilizing the computing device 2300. It should be appreciated that FIG. 13 provides only an illustration of one implementation and does not imply any limitations with regard to the environments in which different embodiments may be implemented. Many modifications to the depicted environment may be made.

Computing device 2300 can include one or more processors 2302, one or more computer-readable RAMs 2304, one or more computer-readable ROMs 2306, one or more computer readable storage media 2308, device drivers 2312, read/write drive or interface 2314, and network adapter or interface 2316, all interconnected over a communications fabric 2318. Communications fabric 2318 can be implemented with any architecture designed for passing data and/or control information between processors (such as microprocessors, communications and network processors, etc.), system memory, peripheral devices, and any other hardware components within the system.

One or more operating systems 2310 and/or application programs 2311, such as network application server software 2067 and database software 2068, are stored on one or more of the computer readable storage media 2308 for execution by one or more of the processors 2302 via one or more of the respective RAMs 2304 (which typically include cache memory). In the illustrated embodiment, each of the computer readable storage media 2308 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device 2300 can also include a R/W drive or interface 2314 to read from and write to one or more portable computer readable storage media 2326. Application programs 2311 on computing devices 2300 can be stored on one or more of the portable computer readable storage media 2326, read via the respective R/W drive or interface 2314 and loaded into the respective computer readable storage media 2308.

Computing device 2300 can also include a network adapter or interface 2316, such as a TCP/IP adapter card or wireless communication adapter. Application programs 2311 on computing devices 2054A-N can be downloaded to the computing device from an external computer or external storage device via a network (for example, the Internet, a local area network or other wide area networks or wireless networks) and network adapter or interface 2316. From the network adapter or interface 2316, the programs may be loaded into the computer readable storage media 2308. The network may comprise copper wires, optical fibers, wireless transmission, routers, firewalls, switches, gateway computers and edge servers.

Computing device 2300 can also include a display screen 2320, a keyboard or keypad 2322, and a computer mouse or touchpad 2324. Device drivers 2312 interface to display screen 2320 for imaging, to keyboard or keypad 2322, to computer mouse or touchpad 2324, and/or to display screen 2320 for pressure sensing of alphanumeric character entry and user selections. The device drivers 2312, R/W drive or interface 2314, and network adapter or interface 2316 can comprise hardware and software stored in computer readable storage media 2308 and/or ROM 2306.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%).

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing system", "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing system, and/or processing unit may be, or further include, memory and/or an integrated memory element, which may be a single memory device, a plurality of memory devices, and/or embedded circuitry of another processing module, module, processing circuit, processing system, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing system, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing system, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing system, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a computing device of an access layer of an object storage system that includes a processor, the method comprises:
    receiving, via a network, a request message from an edge node, wherein the request message indicates a requested access of a data object;
    determining an update frequency and content length of the data object in response to receiving the request message;
    determining a cache time to live (TTL) based on the update frequency and the content length of the data object;
    facilitating performance of the requested access of the data object in response to receiving the request message;
    generating a response message that includes the cache TTL in response to performing the requested access; and
    transmitting the response message to the edge node via the network;
    wherein the determining the update frequency includes calculating an average time period between consecutive updates to the data object by a plurality of edge nodes, and
    wherein the object storage system includes a dispersed storage network (DSN) memory, wherein the requested access corresponds to a write request, and wherein the determining the cache TTL includes:
        calculating an external network transfer time based on receipt of the request message via the network;
        calculating an internal information dispersal algorithm (IDA) time corresponding to a time for the computing device to perform an IDA on the data object to generate a plurality of encoded data slices;
        calculating an internal slice write time corresponding to a time for the computing device to transmit the plurality of encoded data slices of the data object to a plurality of storage units of the DSN memory; and
        calculating the cache TTL by summing the external network transfer time, the internal IDA time, the internal slice write time, and the average time period between subsequent updates to the data object.

2. The method of claim 1, further comprising:
    receiving, via a network, a second request message from the edge node, wherein the second request message indicates the requested access of the data object, wherein the edge node transmitted the second request message in response to determining a duration indicated by the cache TTL has expired;
    determining a new update frequency of the data object in response to receiving the second request message, wherein the new update frequency is higher than the update frequency;
    determining a new cache TTL based on the new update frequency, wherein the new cache TTL corresponds to a shorter duration than the cache TTL in response to the new update frequency being higher than the update frequency;
    generating a second response message that includes the cache TTL; and
    transmitting the second response message to the edge node via the network.

3. The method of claim 1, wherein each of a plurality of quantized update frequency levels corresponds to one of a plurality of fixed cache TTLs, wherein any quantized update frequency level corresponds to one of the plurality of fixed cache TTLs that has a shorter duration than all other ones of the plurality of fixed cache TTLs corresponding to other ones of the quantized update frequency level with lower update frequencies than the any quantized update frequency level, and wherein the determining cache TTL includes:
    determining one of a plurality of quantized update frequency levels that corresponds to the update frequency of the data object; and
    selecting one of the plurality of fixed cache TTLs that corresponds to the one of a plurality of quantized update frequency levels.

4. The method of claim 1, further comprising:
measuring a request latency corresponding to receipt of the request message via the network;
wherein the cache TTL is determined as a function of the update frequency and the request latency.

5. The method of claim 1, wherein the external network transfer time, the internal slice write time, and the internal IDA time are each calculated as a function of the content length of the data object.

6. A processing system of a computing device of an access layer of an object storage system comprises:
at least one processor;
a memory that stores operational instructions, that when executed by the at least one processor cause the processing system to:
receive, via a network, a request message from an edge node, wherein the request message indicates a requested access of a data object;
determine an update frequency of the data object in response to receiving the request message, wherein the update frequency comprises an average time between updates within a predetermined time from a current time;
determine a cache time to live (TTL) based on the update frequency;
facilitate performance of the requested access of the data object in response to receiving the request message;
generate a response message that includes the cache TTL in response to performing the requested access; and
transmit the response message to the edge node via the network;
wherein the determining the update frequency includes calculating an average time period between consecutive updates to the data object by a plurality of edge nodes, and
wherein the object storage system includes a dispersed storage network (DSN) memory, wherein the data object is dispersed stored in the DSN memory as a plurality of encoded data slices, wherein the requested access corresponds to a read request, and wherein the determining the cache TTL includes:
calculating an external network transfer time based on receipt of the request message via the network;
calculating an internal slice read time corresponding to a time for the computing device to retrieve at least a read threshold of the plurality of encoded data slices of the data object from a plurality of storage units of the DSN memory;
calculating an internal reverse information dispersal algorithm (IDA) time corresponding to a time for the computing device to perform a reverse IDA on at least the read threshold of the plurality of encoded data slices to reproduce the data object; and
calculating the cache TTL by summing the external network transfer time, the internal slice read time, the internal reverse IDA time, and the average time period between subsequent updates to the data object.

7. The processing system of claim 6, wherein the operational instructions, when executed by the at least one processor, further cause the processing system to:
receive, via a network, a second request message from the edge node, wherein the second request message indicates the requested access of the data object, wherein the edge node transmitted the second request message in response to determining a duration indicated by the cache TTL has expired;
determine a new update frequency of the data object in response to receiving the second request message, wherein the new update frequency is higher than the update frequency;
determine a new cache TTL based on the new update frequency, wherein the new cache TTL corresponds to a shorter duration than the cache TTL in response to the new update frequency being higher than the update frequency;
generate a second response message that includes the cache TTL; and
transmit the second response message to the edge node via the network.

8. The processing system of claim 6, wherein each of a plurality of quantized update frequency levels corresponds to one of a plurality of fixed cache TTLs, wherein any quantized update frequency level corresponds to one of the plurality of fixed cache TTLs that has a shorter duration than all other ones of the plurality of fixed cache TTLs corresponding to other ones of the quantized update frequency level with lower update frequencies than the any quantized update frequency level, and wherein the determining cache TTL includes:
determining one of a plurality of quantized update frequency levels that corresponds to the update frequency of the data object; and
selecting one of the plurality of fixed cache TTLs that corresponds to the one of a plurality of quantized update frequency levels.

9. The processing system of claim 6, wherein the operational instructions, when executed by the at least one processor, further cause the processing system to:
measure a request latency corresponding to receipt of the request message via the network;
wherein the cache TTL is determined as a function of the update frequency and the request latency.

10. The processing system of claim 6, wherein the operational instructions, when executed by the at least one processor, further cause the processing system to:
determine a length of content of the data object, wherein the external network transfer time, the internal slice read time, and the internal reverse IDA time are each calculated as a function of the length of the content of the data object.

11. A non-transitory computer readable storage medium comprises:
at least one memory section that stores operational instructions that, when executed by a processing system that includes a processor and a memory, causes the processing system to:
receive, via a network, a request message from an edge node, wherein the request message indicates a requested access of a stored data object;
determine an update frequency and content length of the stored data object in response to receiving the request message;
determine a cache time to live (TTL) based on the update frequency and the content length of the stored data object;
facilitate performance of the requested access of the stored data object in response to receiving the request message;
generate a response message that includes the cache TTL in response to performing the requested access; and transmit the response message to the edge node via the network;

wherein:

the determining the update frequency includes calculating an average time period between consecutive updates to the stored data object by a plurality of edge nodes;

the processing system includes a dispersed storage network (DSN) memory;

the stored data object is dispersed stored in the DSN memory as a plurality of encoded data slices;

the requested access corresponds to a read request, and the determining the cache TTL includes:
- calculating an external network transfer time based on receipt of the request message via the network;
- calculating an internal slice read time corresponding to a time for the processing system to retrieve at least a read threshold of the plurality of encoded data slices of the stored data object from a plurality of storage units of the DSN memory;
- calculating an internal reverse information dispersal algorithm (IDA) time corresponding to a time for the processing system to perform a reverse IDA on at least the read threshold of the plurality of encoded data slices to reproduce the stored data object; and
- calculating the cache TTL by summing the external network transfer time, the internal slice read time, the internal reverse IDA time, and the average time period between subsequent updates to the stored data object.

\* \* \* \* \*